(No Model.) 9 Sheets—Sheet 3.
J. A. TATRO.
MACHINE FOR WEAVING WIRE BANDS OR NETTING.
No. 502,148. Patented July 25, 1893.
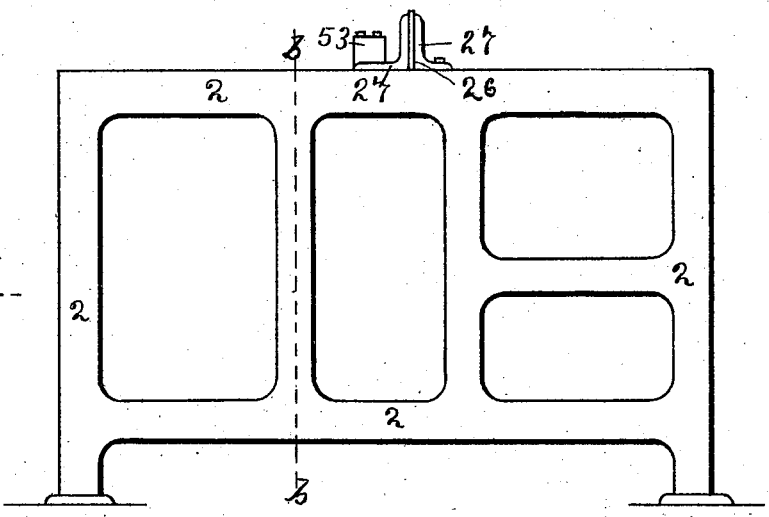
Fig. III.
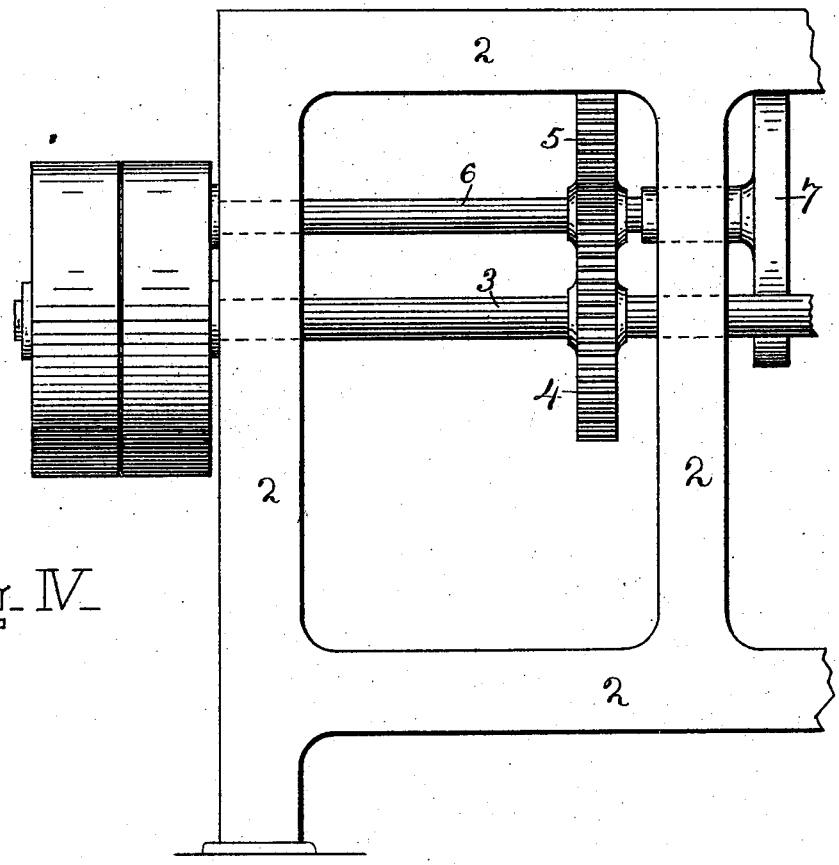
Fig. IV.
Witnesses
Thos. Houghton.
Edwin Guthrie
Inventor
Joseph A. Tatro,
By Chas. F. Benjamin
Attorney

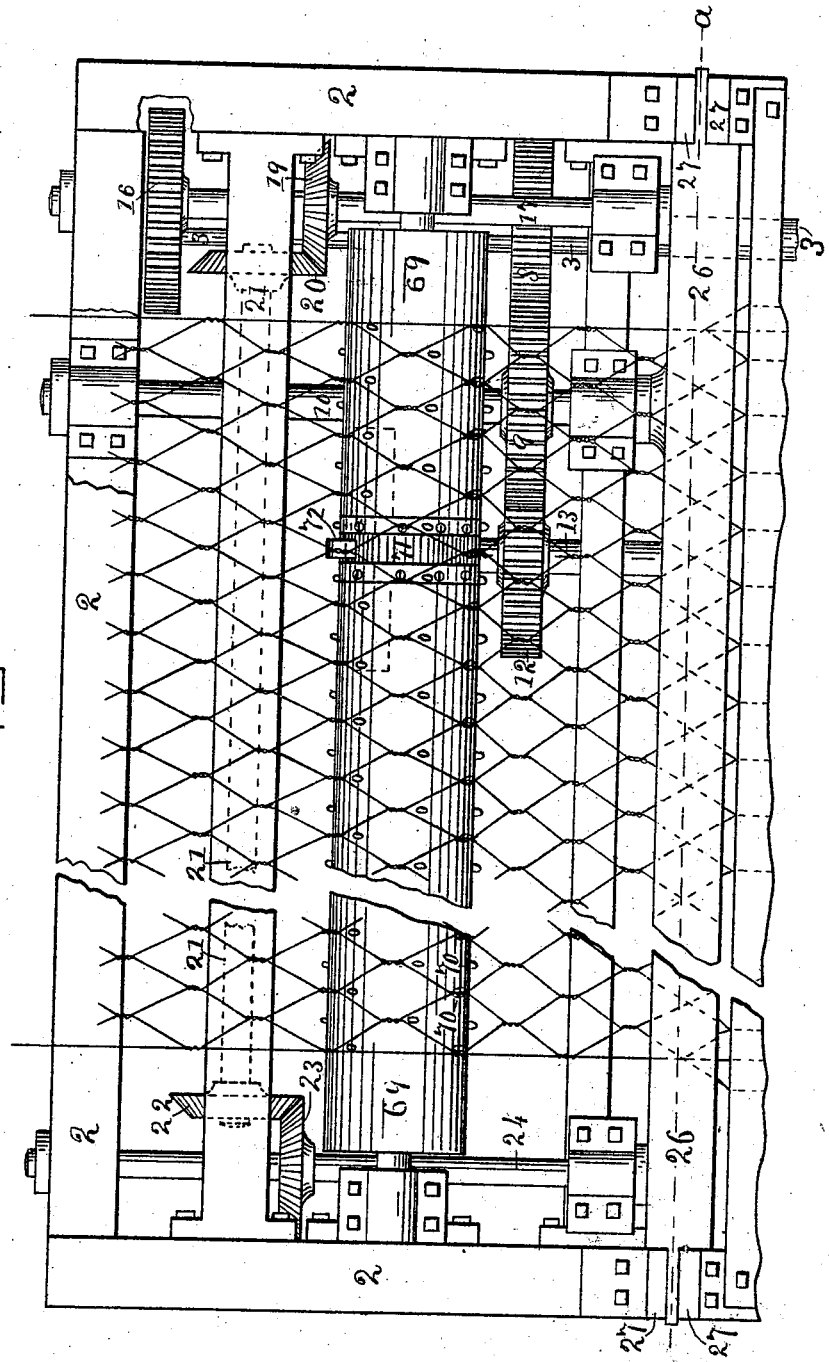

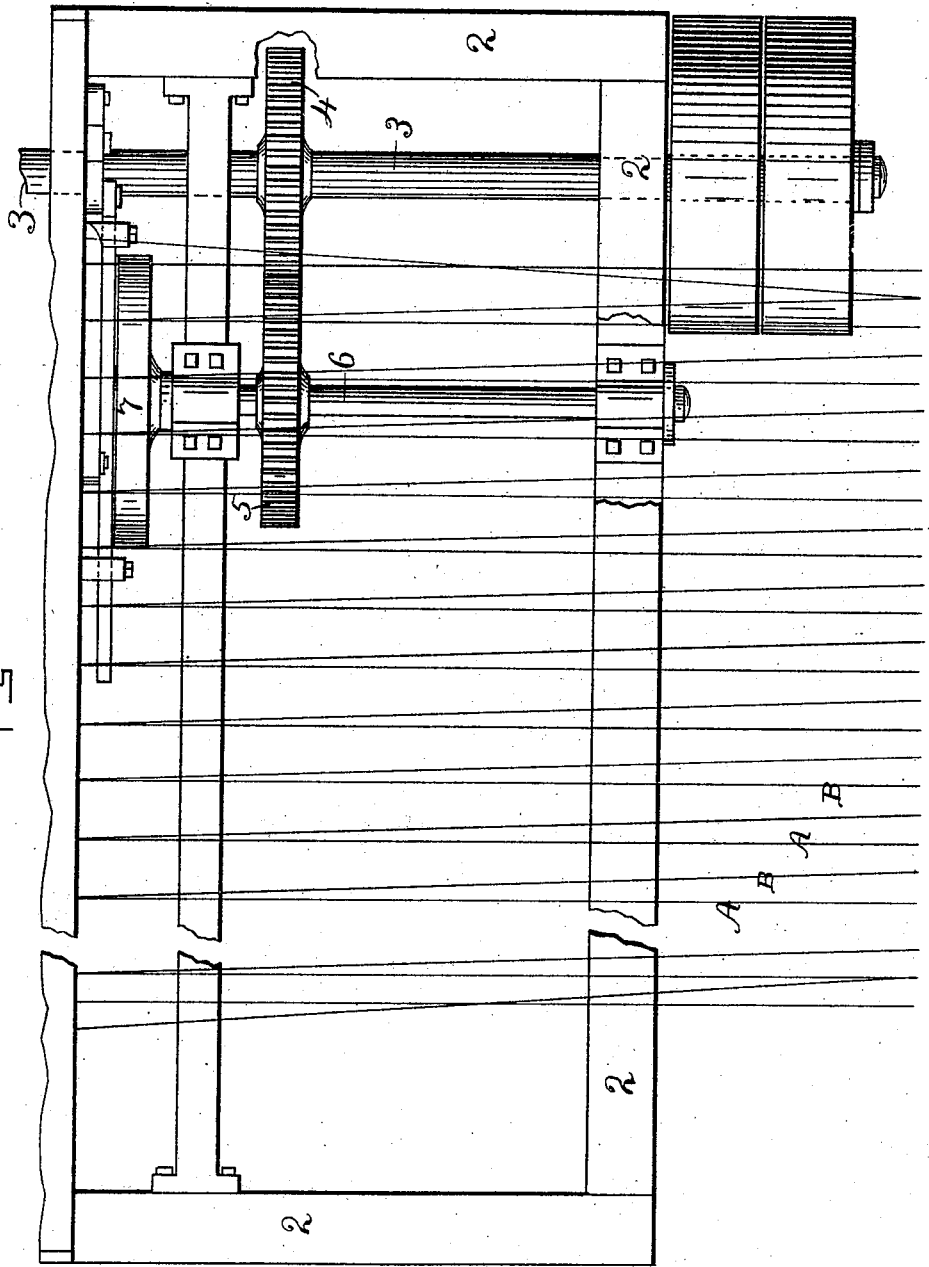

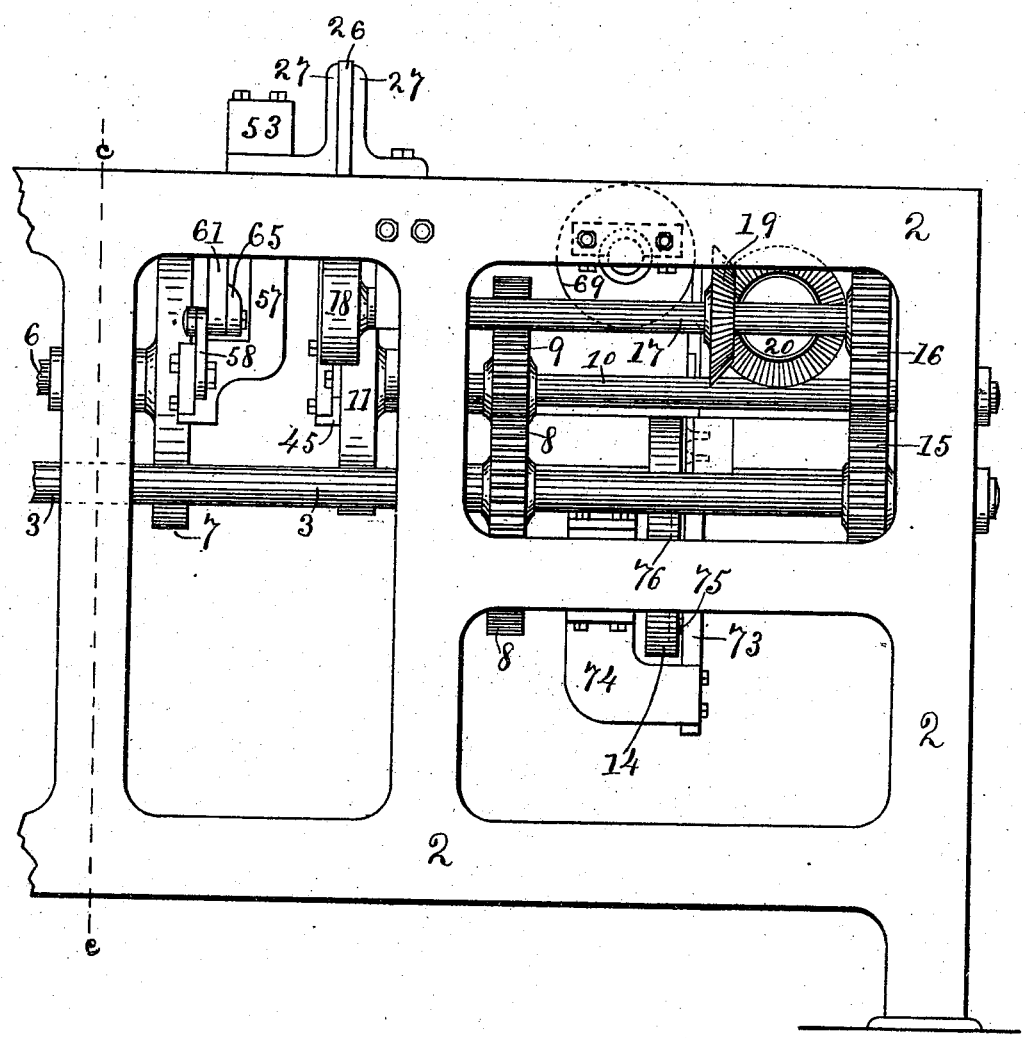

(No Model.)
J. A. TATRO.
MACHINE FOR WEAVING WIRE BANDS OR NETTING.
No. 502,148. Patented July 25, 1893.
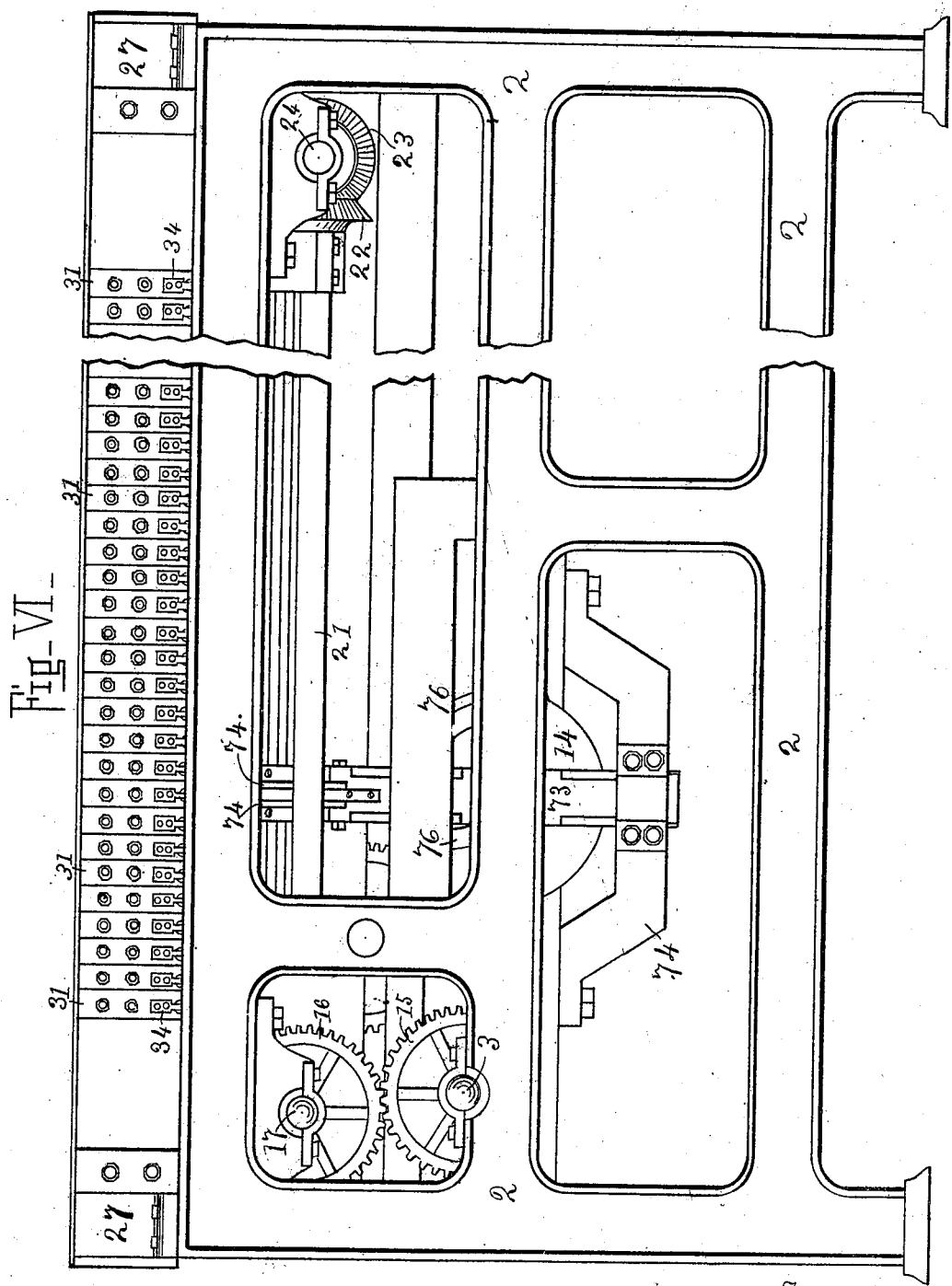

(No Model.) 9 Sheets—Sheet 6.
J. A. TATRO.
MACHINE FOR WEAVING WIRE BANDS OR NETTING.
No. 502,148. Patented July 25, 1893.
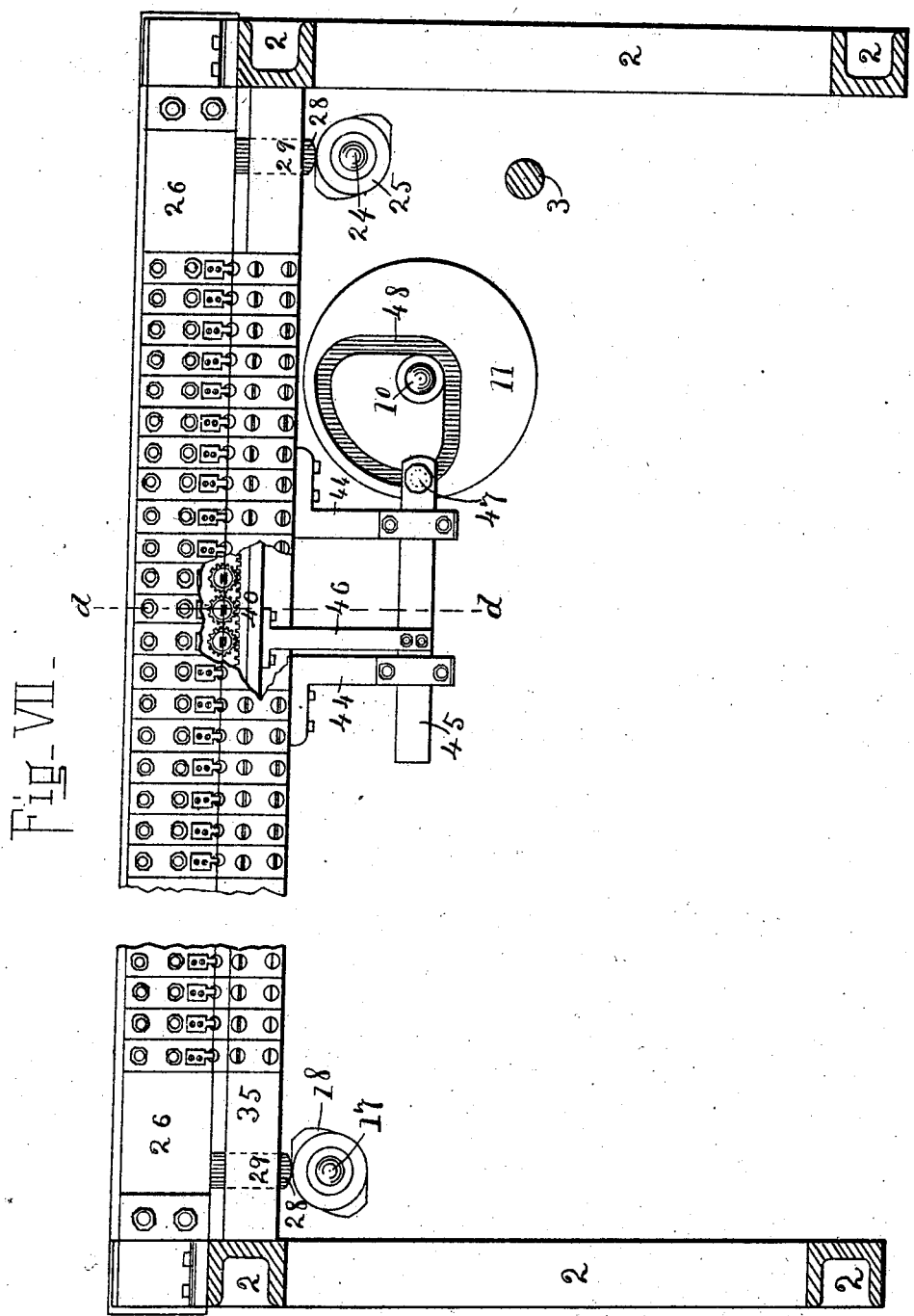
Witnesses
Thos. Houghton.
Edwin Guthrie
Inventor
Joseph A. Tatro,
By Chas. F. Benjamin
Attorney (No Model.) 9 Sheets—Sheet 7.
J. A. TATRO.
MACHINE FOR WEAVING WIRE BANDS OR NETTING.
No. 502,148. Patented July 25, 1893.
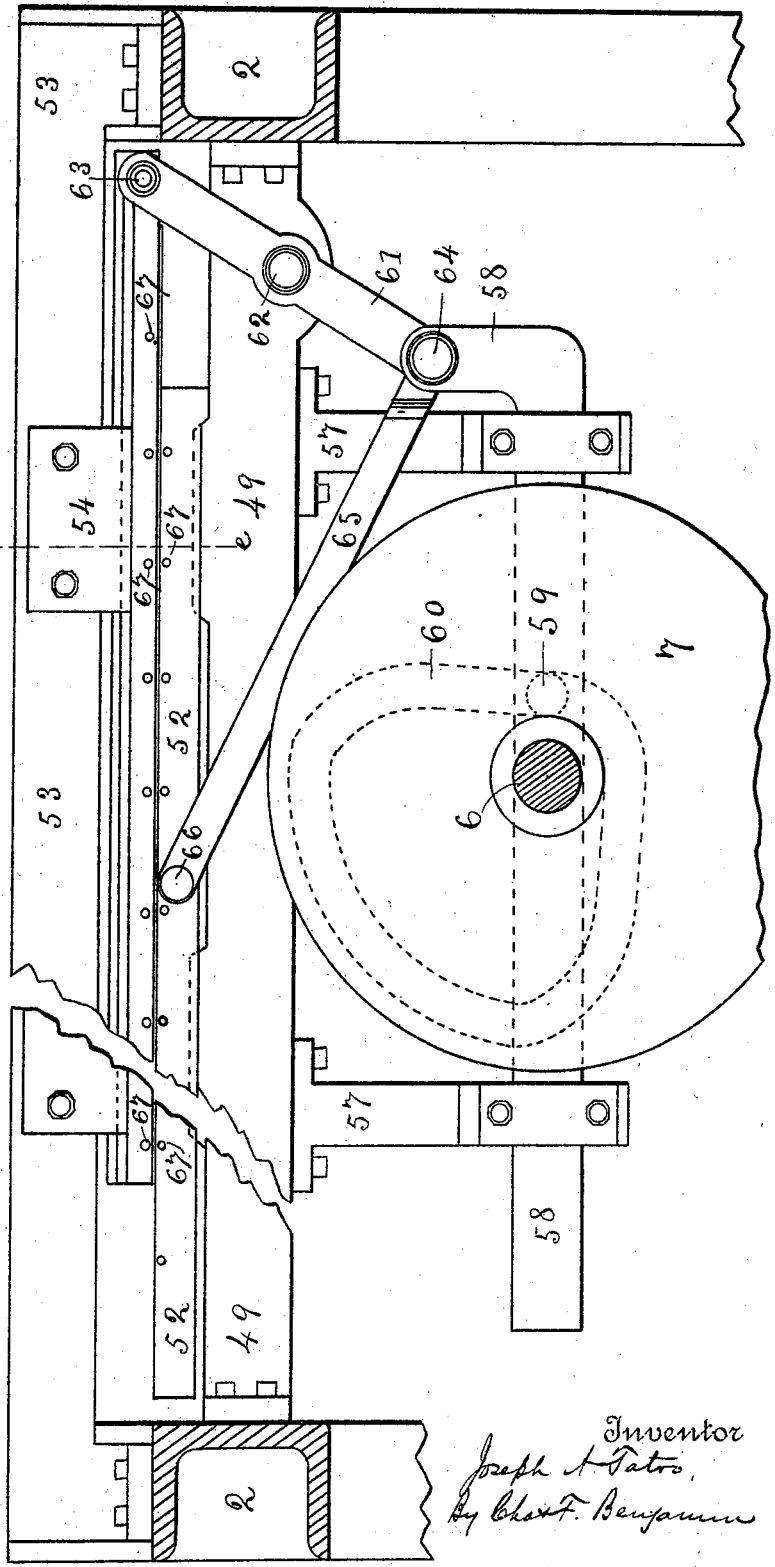
Fig. VIII.
Witnesses
Thos Houghton.
Edwin Guthrie
Inventor
Joseph A. Tatro,
By Chas F. Benjamin
Attorney (No Model.)  9 Sheets—Sheet 8.
J. A. TATRO.
MACHINE FOR WEAVING WIRE BANDS OR NETTING.
No. 502,148. Patented July 25, 1893.
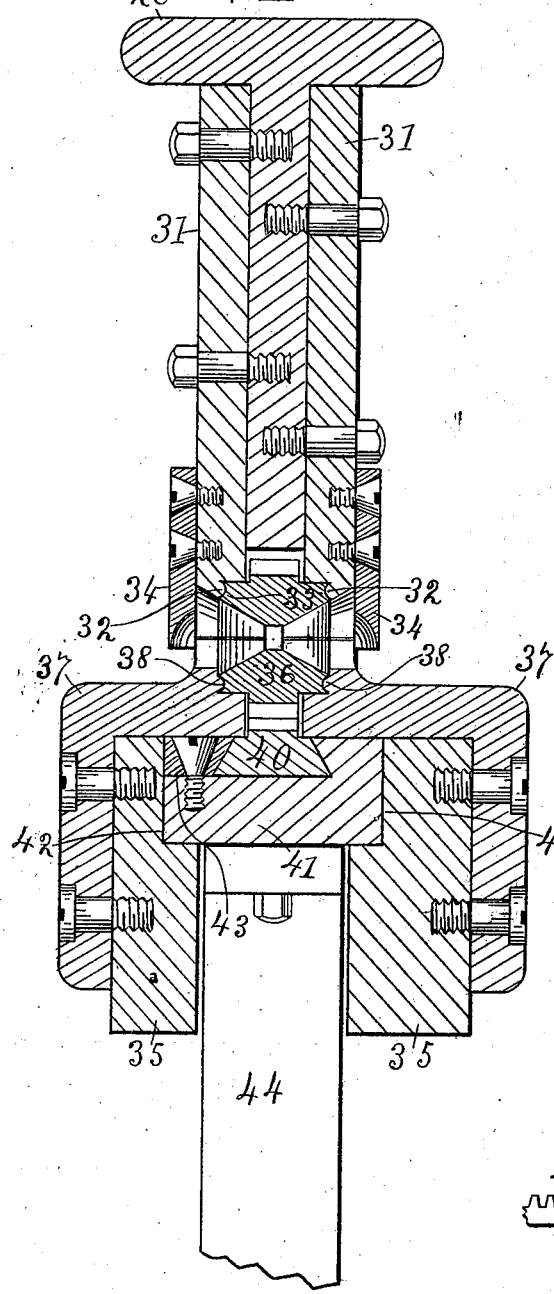
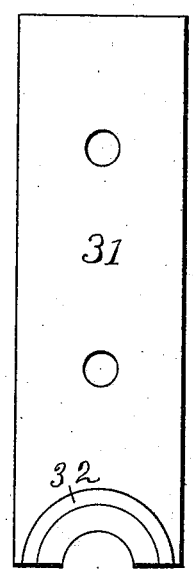
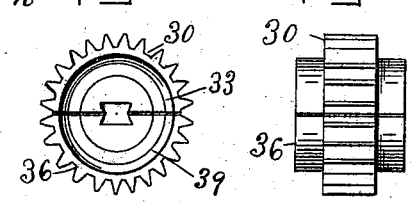
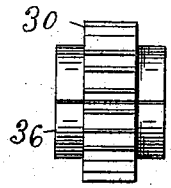
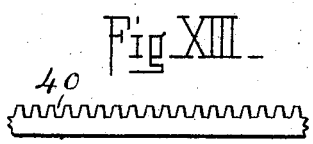
Witnesses
Thos. Houghton.
Edwin Guthrie.
Inventor
Joseph A. Tatro,
By Chas. F. Benjamin
Attorney (No Model.) 9 Sheets—Sheet 9.
J. A. TATRO.
MACHINE FOR WEAVING WIRE BANDS OR NETTING.
No. 502,148. Patented July 25, 1893.
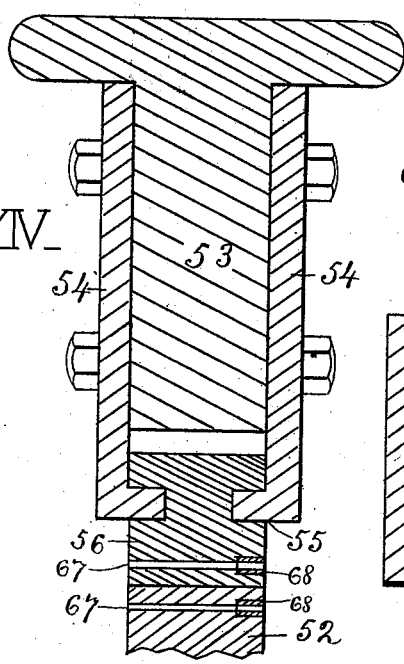
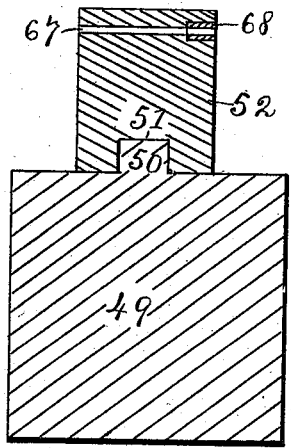
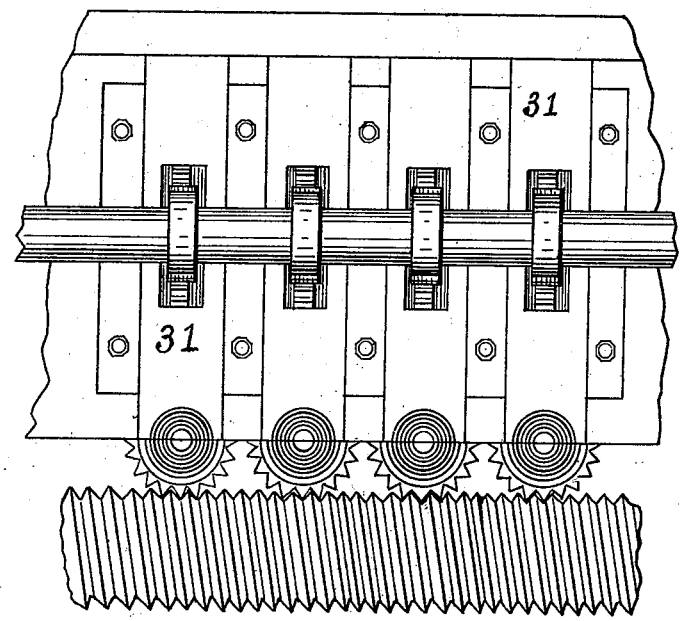
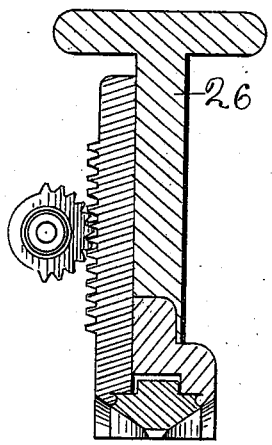
Witnesses
Thos Houghton
Edwin Guthrie
Inventor
Joseph A. Tatro,
By Chas. F. Benjamin
Attorney

UNITED STATES PATENT OFFICE.

JOSEPH ARNO TATRO, OF BEAVER FALLS, PENNSYLVANIA.

MACHINE FOR WEAVING WIRE BANDS OR NETTING.

SPECIFICATION forming part of Letters Patent No. 502,148, dated July 25, 1893.

Application filed November 23, 1892. Serial No. 452,913. (No model.)

*To all whom it may concern:*

Be it known that I, JOSEPH ARNO TATRO, a citizen of the United States, residing at Beaver Falls, in the county of Beaver and State of Pennsylvania, have invented new and useful Improvements in Machines for Weaving Wire Bands and Netting; and I do hereby declare the following to be a full, clear, and exact description of said invention, reference being had to the accompanying drawings, and to the figures and letters of reference marked thereon, which form a part of this specification.

This invention relates to the mechanical weaving of wire strands into meshed netting or meshed bands, and its objects are to improve the arrangements for holding and moving the wire strands during the process of weaving them; to effect a periodical and harmonious movement of the mechanical parts co-operating in the weaving process, and to mesh the wire strands into the desired pattern by twisting them together, at prescribed intervals and places, through a system of rotating wheels, adapted to engage and twist the moving strands of wire.

In the accompanying drawings, wherein like numerals and letters represent like parts, Figure I is a top plan of the front end of the machine; Fig. II, a top plan of the rear end of the machine; Fig. III, a side elevation of the frame; Fig. IV, a side elevation of that portion of the third figure on the left of the dotted line *b b*; Fig. V, a side elevation of that portion of the third figure on the right of said dotted line; Fig. VI, a front elevation of the machine; Fig. VII, a vertical cross section on the line *a a* of the first figure; Fig. VIII, a cross section on the line *c c* of the fifth figure; Fig. IX, a vertical cross section of the housing bar and twisting wheels on the line *d d* of the seventh figure; Fig. X, an inside plan of the plate 31; Fig. XI, a side elevation of one of the twisting wheels; Fig. XII, a face elevation of one of the twisting wheels; Fig. XIII, a side elevation of a part of the rack 40. Figs. XIV and XV show a vertical cross section on the line *e e* of the eighth figure. Fig. XVI shows an alternative movement for the twisting wheels. Fig. XVII is a vertical section of the sixteenth figure.

2 represents the frame of the machine. Within the frame is a main shaft, 3, driven by power brought from without and preferably provided with a loose, as well as the usual band pulley, in order that the belting may be shifted when it is desired to temporarily stop the action of the machine without cutting off the power. A wheel, 4, on the main shaft, gears with the wheel 5 on a shaft, 6, and this shaft carries the cam 7, the function of which will be later explained. Another wheel, 8, on the main shaft, gears with the wheel 9 on a shaft, 10, which shaft carries the cam 11, to be hereinafter described. The aforementioned wheel 9 on this shaft 10 meshes into the wheel 12 on a shaft, 13, and this shaft carries the cam 14, to be further explained hereinafter. A third wheel, 15, on the main shaft, gears with the wheel 16 on a shaft, 17, and this shaft carries a cam, 18, to which further reference will be made. This shaft 17 carries also a miter, 19, gearing with a miter, 20, on a shaft, 21; which shaft carries another miter, 22, meshing with the miter 23 on a shaft 24, and this last named shaft carries also a cam, 25, the function of which will be hereinafter set forth.

By the system of gearing and shafting just described, it is obvious that the rotation of the main shaft 3 will turn the cams 7, 11, 14, 18 and 25, and these cams constitute the motors of the parts of the machine remaining for explanation. The shafts are journaled in the frame of the machine and all of them longitudinally except the transverse shaft 21, and the shafts 3, 6, 10 and 13 are parallel one with another.

Extended across the frame in its upper part is a moving bar, 26, sliding up and down within guides 27, fixed to the frame. Projecting from the lower face of this bar are studs, 28, which pass through guide apertures, 29, and rest upon the cams 18 and 25, the coincident rotation of which reciprocates the bar 26 within its guides. Upon the moving bar is a series of half wheels, 30, fitted to rotate within the housings, 31, fixed to the bar; annular projections, 32, on the plates; fitting in grooves, 33, on the half wheels and preventing other than rotary motion of the wheels. Each housing, 31, has a guide, 34, projecting below the arbor of the wheel. Beneath the moving bar 26 is a fixed bar, 35, bearing a series of half wheels, 36, counterparts of those on the moving bar; each counterpart within its housings, 37, having the like annular projections, 38, fitting into like grooves, 39, on the counterparts 36, as in the case of the housings and half wheels on the moving bar. It is evident that when by the rotation of the cams 18 and 25 the moving bar is brought down upon the fixed bar, each pair of counterpart half wheels operates as a complete wheel. These then completed wheels are rotated by a rack, 40, supported by a movable bar, 41, working through a recess, 42, in the fixed bar above described; the rack having a dovetailed back and being held in place by a plate, 43, which abuts upon the rack and is fixed to the said movable bar. Bracket guides, 44, project from the lower side of the fixed bar and support a horizontal bar, 45, which is connected to the rack by a vertical bar, 46, while a stud, 47, on the horizontal bar works in the groove, 48, of the cam 11, and so moves the rack for the rotation of the united half wheels upon the two co-operating bars.

Across the frame of the machine, parallel with the moving bar 26, is a brace, 49, having a tongue, 50, on its upper surface, which fits into a groove, 51, in the lower face of a shifting bar, 52, and forms a guide for that bar. Another brace, 53, above the brace 49, has upon its sides guide plates, 54, the inwardly projecting tongues of which fit into grooves, 55, of another shifting bar, 56, the brace 49 serving as a support for the two shifting bars. Bracket guides, 57, from the lower side of the brace, 49, support a horizontal sliding bar, 58, and a stud, 59, upon that bar engages with the groove, 60, in the face of the aforementioned cam 7, which thereby imparts motion to said sliding bar. The brace 49 also has pivoted to it a rocking arm, 61, by the stud 62, and this rocking arm is connected to the shifting bar 56 by a stud, 63, and likewise to the sliding bar 58 by the stud 64; also, a connecting rod, 65, is attached to the shifting bar 52 by a stud, 66, and further attached to the stud 64 upon the sliding bar, so that any motion of that bar 58 within its guides, derived from the cam 7, is imparted to both the shifting bars 52 and 56, but in opposite directions.

Apertures, 67, are formed at stated intervals through the two shifting bars, and it may be desirable to provide hardened steel bushings, 68, for these apertures.

Immediately in front of the series of counterparted wheels, and parallel therewith, is a roller, 69, journaled in the frame, the face of which is studded with pins, 70, at stated intervals. A ratchet wheel, 71, is formed in the roller, with teeth sunk below the face thereof, and these teeth are engaged by a pawl, 72, pivotally attached to the upper end of a rod, 73, having vertical movement through the guides 74, bracketed to the frame. This rod bears a stud, 75, working in the groove 76 of the cam 14, by the rotation of which the roller 69 is rotated by periodical movements.

In the operation of the machine, the ends of a series of wires, A, B, are unwound from their spools and passed through the openings 67 in the shifting bars 52 and 56, as the machine stands at rest, with the bar 26 raised. Each wire in the lower shifting bar forms a pair with its neighbor in the upper bar, and each pair is brought forward over the center of the under half of its proper twisting wheel; then the ends of the pair of wires are twisted together and caught upon the proper pin 70 in the large roller. When the whole series of wires have been paired and placed as described the machinery is ready to start. The power being applied to the driving shaft 3, the bar 26 is brought down into connection with the fixed bar 35 by means of the cams 18 and 25, thus uniting the counterpart halves of each twisting wheel; the rack 40 is set in motion by the cam 11, which carries the stud 47 from the center to the periphery of the cam. This motion is communicated to the now united twisting half wheels 36 and 30, each pair of which operates as one, and the twist wheel turns one or more complete revolutions, according to the adjustment of the mechanism, thereby intertwisting the pair of wires held in the arbor of the wheel, which arbor is formed by recessing the center of the straight edge of each half wheel. The continued operation of the machinery now raises the bar 26, and separates each twisting wheel into its counterpart sections; the cam 14 turns the roller 69 upon its axis the distance of a half mesh, while at the same time the shifting bars 52 and 56 are by the cam 7 reciprocated in opposite directions, and the wires caused to cross one another at the point where the twisting wheel sections are ready to inclose and twist them. As the roller 69 revolves by intermittent movements the engaged meshes, in successive longitudinal rows, become detached from the pins in the face of the roller and the woven band or net may be reeled upon a spool mounted beyond the framework, or otherwise removed from the machine. The apertures 67 are so spaced as to conduct the wires in pairs to alternate twisting wheels, and when the bar 26 is raised after each revolution of a set of wheels, the shifting bars 52 and 56 cause the wires to cross upon the alternate twisting wheels not employed in the last preceding revolution, and the new revolution is effected by the return movement of the rack. The cams 7, 14 and 11 are each so constructed that the groove in the face thereof, has a short annular segment well within the edge of the cam and a long annular segment well toward the edge of the cam; the two remaining segments of the grooves being radial. The stud engaged with said groove is at rest in the short segment during one-fourth revolution of the cam, and is then traversed quickly by a radial segment of the groove, after which it is at rest in the long annular segment for a quarter revolution of the cam, and again traversed quickly by the remaining radial segment of the groove. By changing the proportions of the annular segments, preserving, however, their true relation one to another, it is possible to get quicker or slower movement of the reciprocating devices and longer or shorter intervals between the reciprocating movements. Rotation of a pair of wires during the operation of twisting them together is prevented by their bearing against the edges of the housing guides 34 and the distance of the members of a pair of these guides apart regulates the length of a twist.

In Fig. XVI is indicated the substitution of a worm for the rack 40 as a motor for rotating the twisting wheels if desired, the worm to be geared to operating mechanism in the usual or any suitable manner.

The last two figures of the drawings represent a modification which is intended as the subject matter for a separate application for a patent, but is presented here because it is well adapted for some kinds of wire work capable of being done upon this machine. In this modification it will be seen that each pair of housings carrying the upper halves of the twisting wheels has an independent motion within its own slides. With this arrangement it is practicable, after each twisting operation of the series of wheels, to remove such of the pairs of housings from the set as is desired, so that the size of the mesh may be alternately varied. The modification does away with the moving upper bar 26, such of the housings as are used in a single operation being simultaneously lifted and lowered by an ordinary rack and pinion combination such as illustrated.

Having thus described my invention, I claim as follows:

1. In wire weaving machinery, the combination of the upper bar sliding vertically in guides supported by the frame of the machine; the housings dependent from said bar and having the guides at the lower part and the annular projections on the inner faces of said housings; the half wheels, severally supported by and between each pair of the aforesaid housings and having annular grooves engaged with the annular projections of said housings; the fixed bar beneath the aforesaid sliding bar; the housings supported by said fixed bar, having annular projections on the inner faces thereof; the half wheels, in correspondence with the half wheels of the aforesaid sliding bar, severally carried by and between each pair of the last mentioned housings, and having annular grooves engaging with the projections on the inner faces of said housings; the studs depending from the aforesaid sliding bar, near the ends thereof; the two cams mounted beneath and respectively near each extremity of said sliding bar, having their edges in contact with the studs above mentioned and connected with the drive shaft of the machine by a proper system of shafting and gearing; the rack engaging with the toothed edges of the aforesaid half wheels, and supported by the vertical bar fastened beneath said rack; the horizontal bar fixed to and supporting said vertical bar and sliding in guides dependent from the aforesaid fixed lower housing bar, and having a stud at one end thereof; the cam supported near said horizontal bar having the eccentric groove in one of its faces engaged with the aforementioned stud, and rotated from the drive shaft of the machine by a proper system of shafting and gearing, the aforesaid half wheels having each a substantially rectangular recess in the center of the chord or straight edge thereof, corresponding with the like recess in its counterpart and corresponding half wheel; the whole constructed and arranged substantially as described, for the purpose of forming twists in a series of crossed wires arranged in pairs and confined in the arbors formed by the temporary junction of a series of the aforesaid half wheels in pairs, by simultaneously rotating said series of joined wheels, as fully explained herein.

2. In wire weaving machinery the combination of the lower brace across the frame of the machine, having the bracket guides dependent therefrom and the tongue on the upper face thereof; the upper brace across the aforesaid frame, having the guide plates on the sides of said brace; the upper shift bar beneath the said upper brace, having the grooves in its sides, engaged with the guide plates of said brace, and the apertures through the sides of said bar; the lower shift bar above the aforesaid lower brace, having the groove in the under face thereof, engaged with the tongue of said lower brace, and the apertures through the sides of said bar; the sliding bar supported and moving in the bracket guides of the lower brace, having the stud on one face thereof; the cam supported near the said sliding bar, having the groove in its face, engaged with the aforesaid stud on said bar, and suitable shafting and gearing-in system for the rotation of said cam by the drive shaft of the machine; the rocking arm, pivoted to the aforesaid lower brace and pivotally attached to the sliding bar aforesaid and to the upper shift bar, and the rod pivotally connecting the said sliding bar and the lower shift bar aforesaid; the whole constructed and arranged substantially as described, for the purpose of shifting and crossing the wires carried in the apertures of said shift bars, as herein fully explained.

3. The combination in wire weaving machinery of the large roller across the frame of the machine, studded with pins in the face thereof and having its sunken ratchet in its periphery; the bracket guides supported in the frame of the machine beneath said roller; the rod moving vertically in said guides, having a pawl on the upper end thereof, engaged with the ratchet in the aforesaid roller, and a stud on the inner face of said rod, and the cam supported near said rod, having a groove in the face thereof, engaged with the stud on said rod, and provided with a system of shafting and gearing to rotate said cam from the drive shaft of the machine; the whole constructed and arranged substantially as set forth, for the purpose of drawing the strands of wire through the weaving mechanism by periodic movements of the pin-studded roller, as herein fully described.

4. In a machine for weaving wire strands into meshed nettings or bands, wherein the wire strands fed to the machine are twisted together at their junction points, carried toward and crossed one upon another for successive twistings in the formation of the woven pattern, and drawn through the twisting and shifting mechanism by regular spaces in periodic movements, the combination of the following coöperative, coördinated and concurrent parts: first, the twisting wheels, formed each in two counterpart, separable halves; each counterpart recessed at the center of its straight edge to form, when the counterparts are in union, a substantially rectangular arbor; each counterpart also mounted and rotatable between a pair of housings provided with annular projections on their inner faces fitting in corresponding grooves in the faces of the counterparts; the paired housings for each set of half wheels being supported in a row, in the like vertical and horizontal planes, by a horizontal bar; the two bars being parallel and one above the other, and the upper bar being so fitted to the frame of the machine as to move up and down for the separation and reunion of the counterparts forming each wheel, with proper and familiar mechanism to lift said bar and permit it to descend in the regular and continuous operation of the machine, and the set of twisting wheels—the counterparts being in union by the descent of the upper bar upon the fixed lower bar—being simultaneously rotated one or more complete revolutions by a horizontal, longitudinal moving rack in contact with the peripheries of the wheels, or other proper and familiar mechanical motor: secondly, the pair of shifting bars, arranged in horizontal position one above the other, parallel with the twist wheel bars, and so fitted as to slide longitudinally in the frame of the machine; the said bars pierced through their sides with a series of apertures at regular intervals and in such relation that each aperture in one bar pairs with an aperture in the other bar, and the said bars being simultaneously moved in opposite directions, for a prescribed distance, by proper and familiar motor mechanism; thirdly, the horizontal roller, carried in the frame of the machine, parallel with the twist wheel bars and shifting bars; studded with pins in the face thereof which are set at regular longitudinal and cross intervals to correspond with the twists in the woven fabric, and said roller turned in prescribed arcs of rotation and at regular intervals by proper and familiar mechanical means of rotation; fourthly, a revolving shaft, driven by suitable power, and properly and familiarly connected and geared to the motors of the aforesaid upper twist-wheel bar, twisting wheels, shifting bars and pin-studded roller; the whole constructed and arranged substantially as described, for the purpose of weaving strands of wire into a meshed netting or band by a continuous rotation of the said revolving shaft and the coördinated movement of the twisting, shifting and driving mechanism herein fully explained.

In testimony whereof I affix my signature in the presence of two subscribing witnesses.

JOSEPH ARNO TATRO.

Witnesses:
JNO. W. CULMER,
J. F. MERRIMAN.